(No Model.)

W. T. BARRY
CARBURETOR.

No. 251,673. Patented Dec. 27, 1881.

WITNESSES
B. W. Williams
Edward Menard

INVENTOR
William T. Barry
By his atty.
Henry W. Williams

UNITED STATES PATENT OFFICE.

WILLIAM T. BARRY, OF QUINCY, MASSACHUSETTS, ASSIGNOR TO THE AMERICAN GAS CARBONIZER COMPANY, OF PORTLAND, MAINE.

CARBURETOR.

SPECIFICATION forming part of Letters Patent No. 251,673, dated December 27, 1881.

Application filed July 6, 1881. (No model.)

*To all whom it may concern:*

Be it known that I, WILLIAM T. BARRY, of Quincy, in the county of Norfolk and State of Massachusetts, have invented certain new and useful Improvements in Carburetors, of which the following is a specification.

This is an improved carburetor for carbureting air or gases, and is particularly an improvement upon the machine for which a patent was granted to Charles W. Soule, May 18, 1880, the Letters Patent being numbered 227,853; and the invention consists, first, in the peculiar construction and arrangement of the float and adjacent parts and the extension of the guide pipe down through said float, whereby an air cushion or chamber is formed, so that when the generator is filled with hydrocarbon oil or other suitable fluid the float will rise with the fluid and be sustained on the surface by means of said air-cushion, thus avoiding the use of weights and pulleys shown in the patent above alluded to; and, second, in a perforated tube or receiver, below described, whereby the air or gases are delivered to and forced to mingle with the vapors in the carburetor in numerous separate jets or currents, thus causing a more thorough and complete carburization of such air or gases, and hence producing a rich and superior gas for illuminating purposes, the said tube or receiver being arranged as below set forth.

Figure 1:
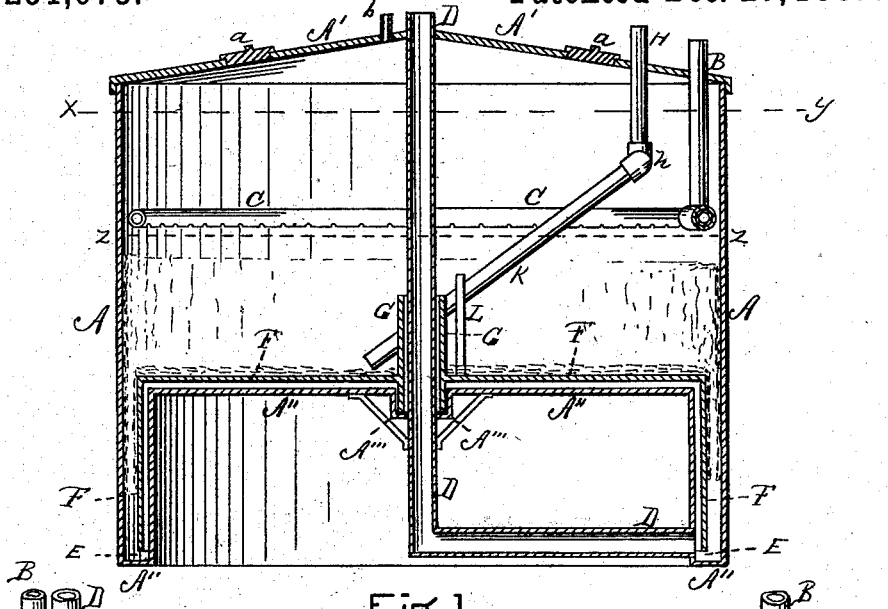
Figure 2:
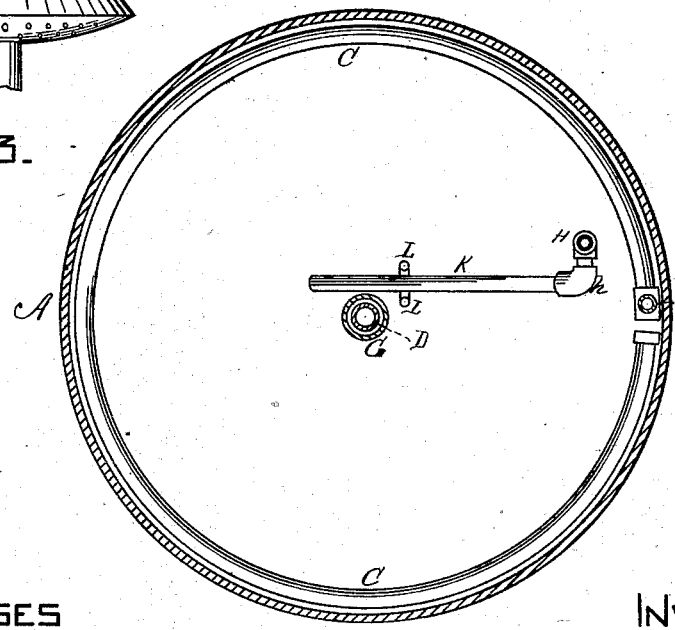

In the accompanying drawings, in which similar letters of reference indicate like parts, Figure 1 is a central vertical section of my improved carburetor. Fig. 2 is a horizontal section on line $x\,y$, Fig. 1.

A represents the sides, A' the top, and A" the bottom, of the carburetor.

B is the pipe admitting the air or gas and leading into the annular pipe or tube C, provided with perforations greater or less in number on its under side.

D is the pipe through which the hydrocarbon fluid is poured into the carburetor, said pipe passing centrally down through the bottom A", and then being bent horizontally, so as to enter the tank and allow the liquid to flow into the annular space E.

F is the float, of the shape shown, and G is the guide-pipe, made integral with the float, surrounding the pipe D, and extending down below said float, the bottom of the carburetor being dropped at A''' for the purpose.

H is the outlet-pipe for conducting the gas to the burners for consumption, connected by the joint $h$ with the pipe K, which is supported by the bifurcated standard L, extending upward from the float F, for the purpose of keeping the opening of the pipe K near the float as it rises and falls, substantially as and for the purpose described in the Soule patent above mentioned.

The operation is as follows: As the oil is poured in through the pipe D it flows into the annular space E, and, rising, reaches the lower end of the guide-pipe C, when, there being no outlet for the air, an air-cushion is formed, which lifts the float F as the oil rises below it. Thus the use of weights and pulleys is done away with.

The broken line $z\,z$ shows the height to which the float may be lifted.

Figure 3:
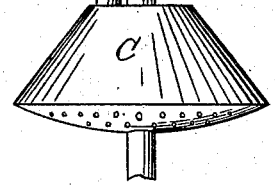
Figure 4:
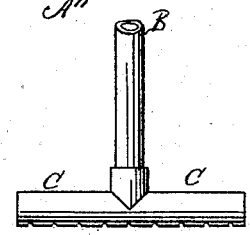

The perforated pipe C causes the admitted air or gas to jet out in numerous small currents into the carburetor, and hence to become thoroughly carbureted by mixing with the vapors of hydrocarbon. There may be various modifications of this annular tube C. Fig. 3 shows it in the shape of a vase or receiver, C, perforated and placed near the center of the machine. Fig. 4 shows the same tube straight and suspended horizontally in the central portion of the carburetor; but I prefer the annular-shaped pipe C, as shown in Figs. 1 and 2.

$a\,a$ represent man-holes, and $b$ a vent-tube for the outlet of the air when filling. By this means of forcing the air or gas of low candle-power immediately in contact with vapors of hydrocarbon I obtain an immediate carburization, instantaneously forming an illuminating-gas of very great candle-power, producing continually the same evenness of results.

I do not claim any process of carburization by showering or dripping the hydrocarbon oil onto the air. Neither do I claim any process of carburization by bubbling the air up through the oil, but simply apparatus, substantially as set forth, for bringing these numerous currents directly in contact with the vapors of hydrocarbon, thereby producing an instantaneous and thorough carburization.

Having thus fully described my improvements, what I claim, and desire to secure by Letters Patent, is—

1. In combination with the case of the carburetor provided with the bottom A" A''', the float F, and the guide-pipe G, the said guide-pipe extending down through the float, all constructed and arranged substantially as described, and for the purpose specified.

2. In a carburetor, the combination, with the case and the pipe B, for admitting air or gases, of the perforated annular pipe or tube C, the float F, and the automatically-adjusting gas-outlet pipe K, substantially as described, and for the purposes set forth.

WILLIAM T. BARRY.

Witnesses:
HENRY W. WILLIAMS,
B. W. WILLIAMS.